G. OERLLEIN.
Thrashing Machine.
No. 91,257. Patented June 15, 1869.
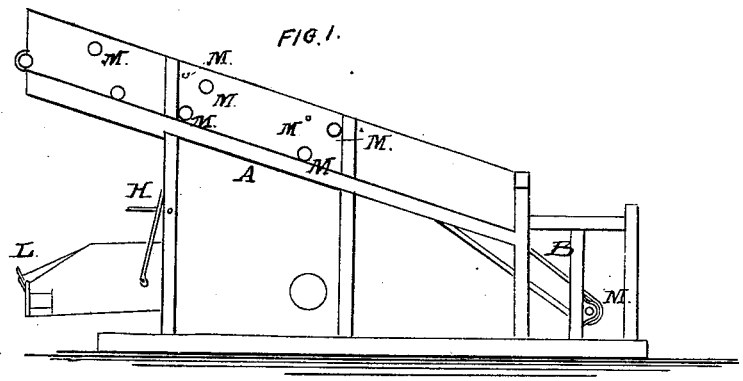
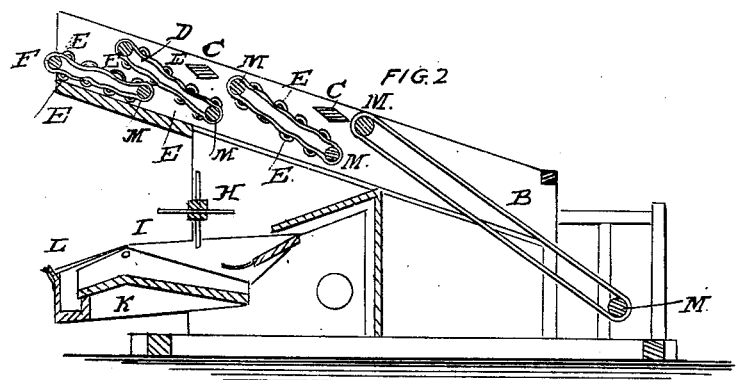
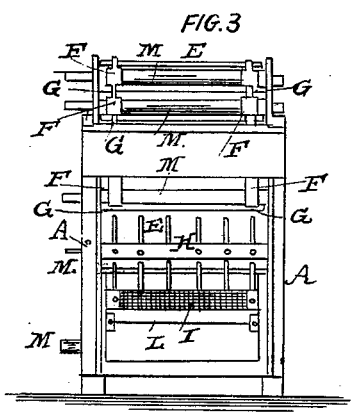

United States Patent Office.

GEORGE OERLLEIN, OF UTICA, MINNESOTA.

Letters Patent No. 91,257, dated June 15, 1869.

IMPROVEMENT IN THRESHING-MACHINES.

The Schedule referred to in these Letters Patent and making part of the same.

*To all whom it may concern:*

Be it known that I, GEORGE OERLLEIN, of the town of Utica, and county of Winona, and State of Minnesota, have invented a new and useful Improvement in Threshing-Machines; and I do hereby declare that the following is a full, clear, and exact description thereof, which will enable those skilled in the art to make and use the same, reference being had to the accompanying drawing, forming part of this specification, in which—

Figure 1 is a side view of my invention;
Figure 2, a longitudinal sectional view; and
Figure 3, an end view.

Similar letters of reference in each of the figures indicate corresponding parts.

The nature of my invention consists in providing a threshing-machine with certain arrangements by which grain can be threshed in an effectual and economical manner.

A is the frame of my invention.

B, the canvas conveyer, which conveys the grain and straw from the threshing-cylinder to the straw-carriers.

C C, straw-whippers.

D D D, carriers for the straw.

E, slats in the straw-carriers.

F, belts in which the slats are fastened, by slits cut in these belts, and the slats put through.

G, slits in the belts for the slats.

H, sieve-cleaner, to be run with a belt.

I, lower sieve.

K, sliding board, to take wheat that may be forced over the lower sieve by the cleaner and the wind, and sliding it into a conveyer, which carriers it to the straw-carriers again.

L, a board hung by hinges that can be raised or lowered, as desired, to keep the wheat from going over on to the ground, which may be forced over the sieves by the cleaner and the wind.

M, the various shafts, which are to have pulleys on them, with which belts are to drive them from a driving-pulley.

Operation.

Put the power to a threshing-machine with my attachments to it, and the straw and grain will be carried up by the carrier B, the first whipper C will carry it on to the first straw-carrier D, which will carry it forward until the second whipper C will take over on to the second straw-carrier, and so on, the wheat falling through between the slats E on to the sliding board underneath, when it will be moved, and fall on to the lower sieve in front of the cleaner H, which, revolving rapidly, keeps the sieve clean, and whatever of wheat passes the cleaner, falls through the back side of the sieve, and is conveyed up again to the carriers, the hinged board L keeping it from falling on to the ground.

What I claim as my invention, and desire to secure by Letters Patent, is—

1. Straw-carriers D, in combination with the straw-whippers C, constructed and arranged substantially as described.

2. Sieve I, in combination with the sliding board K, substantially as and for the purpose described.

3. Hinged board L, in combination with sieve I and sliding board K, substantially as and for the purpose described.

GEORGE OERLLEIN.

Witnesses:
J. B. SMITH,
WM. HOVNOR.